US006293296B1

(12) United States Patent
Konishi et al.

(10) Patent No.: US 6,293,296 B1
(45) Date of Patent: Sep. 25, 2001

(54) HIGH-PRESSURE FUEL PUMP DEVICE

(75) Inventors: Keiichi Konishi; Wakaki Miyaji; Masahiko Fujita; Akira Morishita, all of Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/427,486

(22) Filed: Oct. 27, 1999

(30) Foreign Application Priority Data

Apr. 20, 1999 (JP) ........................................ 11-111876

(51) Int. Cl.[7] ........................................ G05D 16/10

(52) U.S. Cl. ............... 137/115.13; 123/514; 137/115.26; 137/544; 137/563

(58) Field of Search .......................... 137/115.13, 115.26, 137/563, 565.35, 544; 123/514; 417/307

(56) References Cited

U.S. PATENT DOCUMENTS 2,639,725 * 5/1953 Albright ...................... 137/115.13 X
5,613,476 * 3/1997 Oi et al. ............................. 123/509
5,655,504 * 8/1997 Iwai .................................... 123/511
5,704,399 * 1/1998 Hayashi et al. ...................... 137/884
5,762,047 * 6/1998 Yoshioka et al. .................... 123/509
5,884,664 * 3/1999 Nagai et al. ......................... 137/884

FOREIGN PATENT DOCUMENTS 2689226 8/1997 (JP) .

* cited by examiner

*Primary Examiner*—Stephen M. Hepperle
(74) *Attorney, Agent, or Firm*—Sughrue, Mion, Zinn, Macpeak & Seas, PLLC

(57) ABSTRACT

A high-pressure fuel pump device which can facilitate the assembly of a high-pressure pump and a high-pressure regulator by standardizing a pump body or a valve housing.

The pump body of the high-pressure pump has a high-pressure valve connection portion on the exterior side including a high-pressure passage which is used to connect the high-pressure regulator, the valve housing of the high-pressure regulator has a high-pressure pump connection portion on the exterior side including a high-pressure passage which is used to connect the high-pressure pump, and the high-pressure valve connection portion and the high-pressure pump connection portion are connected to each other to assemble the high-pressure pump and the high-pressure regulator together.

1 Claim, 14 Drawing Sheets

HIGH-PRESSURE FUEL PUMP DEVICE

BACKGROUND OF THE INVENTION

1. Field of the Invention

The present invention relates to a high-pressure fuel pump device comprising a high-pressure pump and a high-pressure regulator.

2. Description of the Prior Art

Diesel engines are widely known as an example of the engine technology that the fuel is injected into its cylinders, which is so called "in-cylinder injection engine" or "direct injection engine". For spark ignition (gasoline) engines also, in-cylinder injection types have recently been proposed. For gasoline engines, there have been recently implemented in-cylinder injection type engines. For example, a high-pressure fuel pump device comprising a high-pressure pump and a high-pressure regulator is disclosed by Japanese Patent Publication No. 2689226.

FIG. 14 is a schematic diagram showing an automobile fuel supply system disclosed by the above publication. In FIG. 14, reference numeral 1 denotes a delivery pipe which is a fuel injection unit, 2 injectors corresponding to the number of the cylinders of an engine 3, 4 a high-pressure fuel pump device attached to the housing of the engine 3, 5 a first housing of the high-pressure fuel pump device 4, 6 a second housing of the high-pressure fuel pump device 4, 7 a connection portion between the first housing 5 and the second housing 6, 8 a high-pressure pump for increasing the pressure of fuel to a high level, and 9 a pumping element 9 incorporated in the first housing 5. The pumping element 9 has such elements as a piston driven by an unshown cam which turns at a half speed of the crank speed of the engine 3 and a cylinder for holding the piston in such a manner that it can reciprocate. Denoted by 10 is an intake valve arranged at the connection portion 7, 11 a discharge valve arranged at the connection portion 7, 12 a high-pressure regulator incorporated in the second housing 6, for adjusting the pressure of fuel by draining part of high-pressure fuel, 13 a low-pressure passage formed in the first housing 5, 14 a low-pressure passage of the second housing side formed in the second housing 6, 15 a high-pressure passage on the first housing side formed in the first housing 5, 16 a first high-pressure passage on the second housing side formed in the second housing 6, 17 a second high-pressure passage on the second housing side formed in the second housing 6, 18 a drain return passage formed in the second housing 6, 19 a fuel tank, 20 a low-pressure pump stored in the fuel tank 19, 21 a low-pressure pipe connected to the outlet portion of the low-pressure pump 20 and to the low-pressure passage 14 on the second housing side, 22 a high-pressure pipe connected to the high-pressure passage 16 on the second housing side and to the inlet portion of the delivery pipe 1, 23 a high-pressure pipe connected to the outlet portion of the delivery pipe 1 and to the second high-pressure passage 17 on the second housing side, 24 a drain return pipe connected to the drain return passage 18 and to the fuel tank 19, and 25 fuel stored in the fuel tank 19. The high-pressure pump 8 is composed of such elements as the first housing 5, the second housing 6, the pumping element 9, the intake valve 10, the discharge valve 11, the low-pressure passage 13 on the first housing side and the high-pressure passage 15 on the first housing side.

A description is subsequently given of the operation of the above fuel supply system. The low-pressure pump 20 sucks the fuel 25 and increases the pressure of the fuel to a low level. This low-pressure fuel 25 is sucked into the pumping element 9 from the low-pressure pipe 21 through the low-pressure passage 14 on the second housing side, the intake valve 10 and the low-pressure passage 13 on the first housing side. The pumping element 9 increases the pressure of the sucked fuel 25 to a high level and discharges it. This high-pressure fuel 25 is supplied to the delivery pipe 1 through the high-pressure passage 15 on the first housing side, the discharge valve 11, the first high-pressure passage 16 on the second housing side and the high-pressure pipe 22. At the fuel injection timing of each cylinder of the engine 3, the corresponding injector 2 injects the high-pressure fuel 25 into the cylinder of the fuel injection timing. When the pressure of the fuel 25 supplied to the second high-pressure passage 17 on the second housing side from the delivery pipe 1 through the high-pressure pipe 23 exceeds a predetermined level set by the high-pressure regulator 12, the high-pressure regulator 12 drains part of the fuel 25 in the second high-pressure passage 17 on the second housing side to control the pressure of the fuel supplied to the delivery pipe 1 from the pumping element 9 at a predetermined high level. This drained fuel 25 is returned to the fuel tank 19 from the drain return passage 18 through the drain return pipe 24.

The above high-pressure fuel pump device 4 of the prior art is structured such that the high-pressure pump 8 includes part of the connection portion 7, that is, the intake valve 10 and the discharge valve 11 are arranged in the connection portion 7 between the first housing 5 and the second housing 6. The high-pressure pump 8 can be a single-cylinder pump having only one piston in the pumping element 9 or a multi-cylinder pump having multiple pistons in the pumping element 9, while the high-pressure regulator 12 can be of a mechanical type for controlling the pressure of fuel to a fixed level or of an electromagnetic type for controlling the pressure of fuel to a variable level. Therefore, with the above mentioned high-pressure pump device 4, it has been difficult to standardize the design of the first housing 5 and/or the second housing 6 per technologies used for the high-pressure pump 8, single-cylinder or multi-cylinder, and per the technologies used for the high-pressure regulator 12, mechanical type or electromagnetic type.

SUMMARY OF THE INVENTION

It is an object of the invention to solve the above problem by providing a high-pressure pump device which can facilitate the assembly of a high-pressure and a high-pressure regulator by standardizing a pump body or valve housing.

According to a first aspect of the present invention, there is provided a high-pressure pump device comprising a high-pressure pump for increasing the pressure of fuel to a high level and a high-pressure regulator for controlling the pressure of fuel by draining part of fuel discharged from the high-pressure pump, wherein the pump body of the high-pressure pump has a high-pressure valve connection portion including a high-pressure passage on the exterior side and used to connect the high-pressure regulator, the valve housing of the high-pressure regulator has a high-pressure pump connection portion including a high-pressure passage on the exterior side and used to connect the high-pressure pump, and those high-pressure connection portions are connected to each other to assemble the high-pressure pump and the high-pressure regulator together.

According to a second aspect of the present invention, there is provided a high-pressure pump device, wherein the high-pressure connection portions on the pump body and on the valve housing are connected to each other by mating.

According to a third aspect of the present invention, there is provided a high-pressure pump device, wherein the pump body has a low-pressure valve connection portion including a low-pressure passage on the exterior side, the valve housing has a low-pressure connection portion including a low-pressure passage on the exterior side, and those low-pressure connection portions are connected to each other and the high-pressure connection portions are connected to each other when the high-pressure pump and the high-pressure regulator are assembled together.

According to a fourth aspect of the present invention, there is provided a high-pressure pump device, wherein the low-pressure connection portions on the pump body and on the valve body are connected to each other face-to-face.

According to a fifth aspect of the present invention, there is provided a high-pressure pump device, wherein the valve housing has a drain return passage for returning fuel to the low-pressure passage of the high-pressure pump.

According to a sixth aspect of the present invention, there is provided a high-pressure pump device, wherein the drain return passage is connected to the low-pressure passage on a downstream side of a filter.

According to a seventh aspect of the present invention, there is provided a high-pressure pump device, wherein the pump body and the valve housing are fastened to each other by bolts together with fuel pipes connected to the valve housing.

The above and other objects, features and advantages of the invention will become more apparent from the following description when taken in conjunction with the accompanying drawings.

BRIEF DESCRIPTION OF THE ACCOMPANYING DRAWINGS

DETAILED DESCRIPTION OF THE PREFERRED EMBODIMENTS

Embodiment 1

Figure 1:
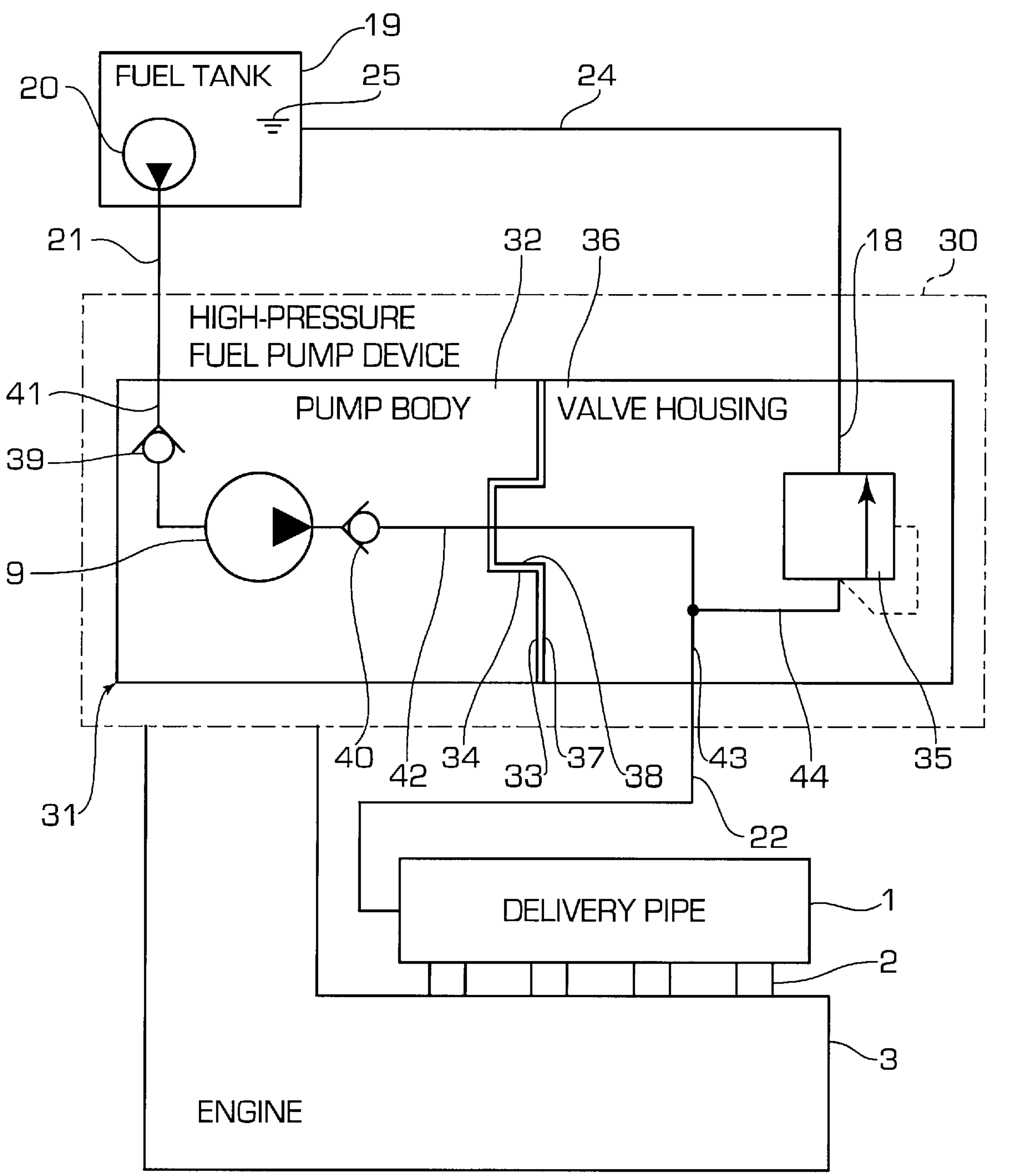
FIG. 1 is a schematic diagram showing a fuel supply system according to Embodiment 1 of the present invention.
Figure 2:
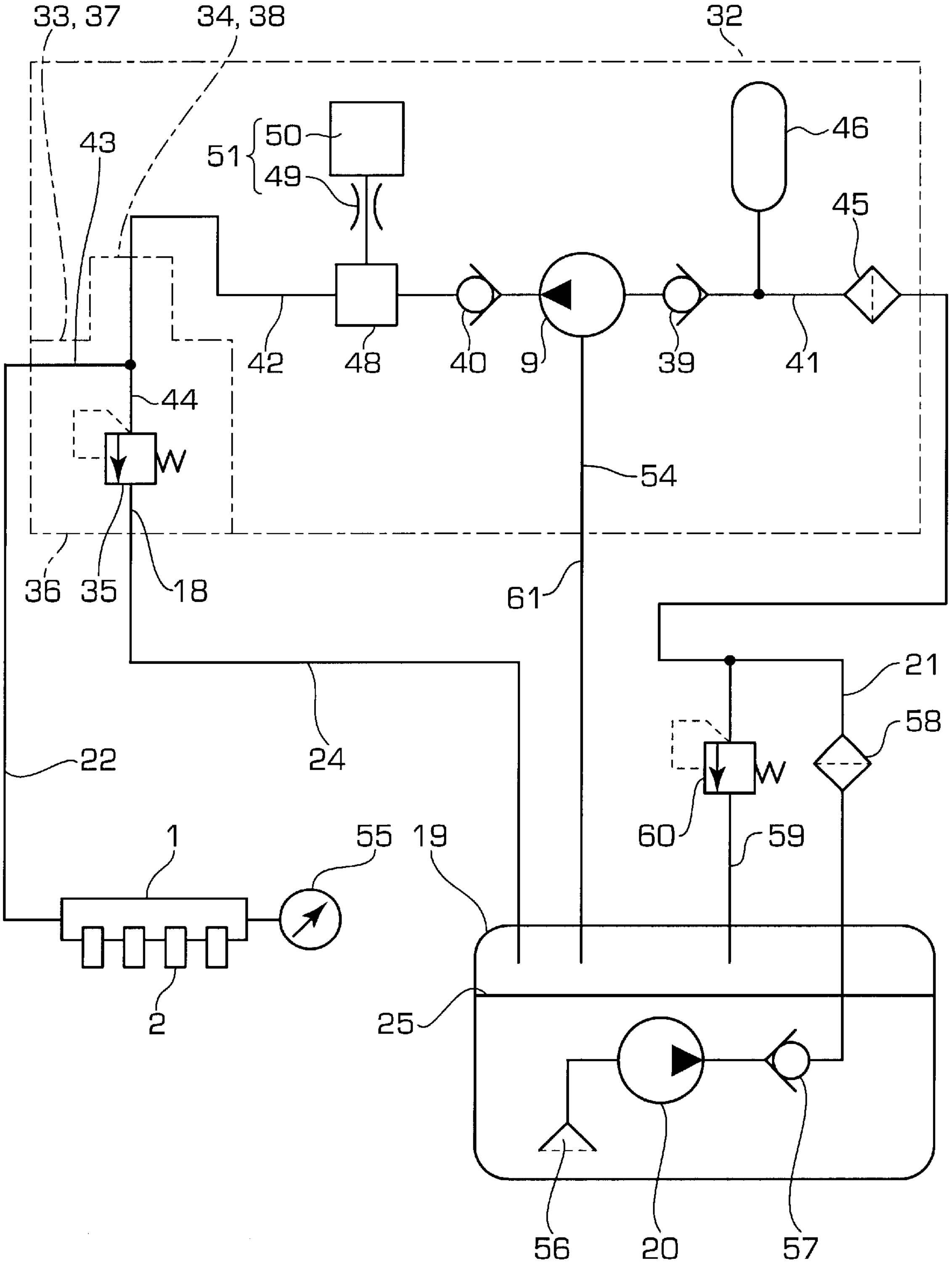
FIG. 2 is a schematic diagram showing details of the fuel supply system according to Embodiment 1.
Figure 3:
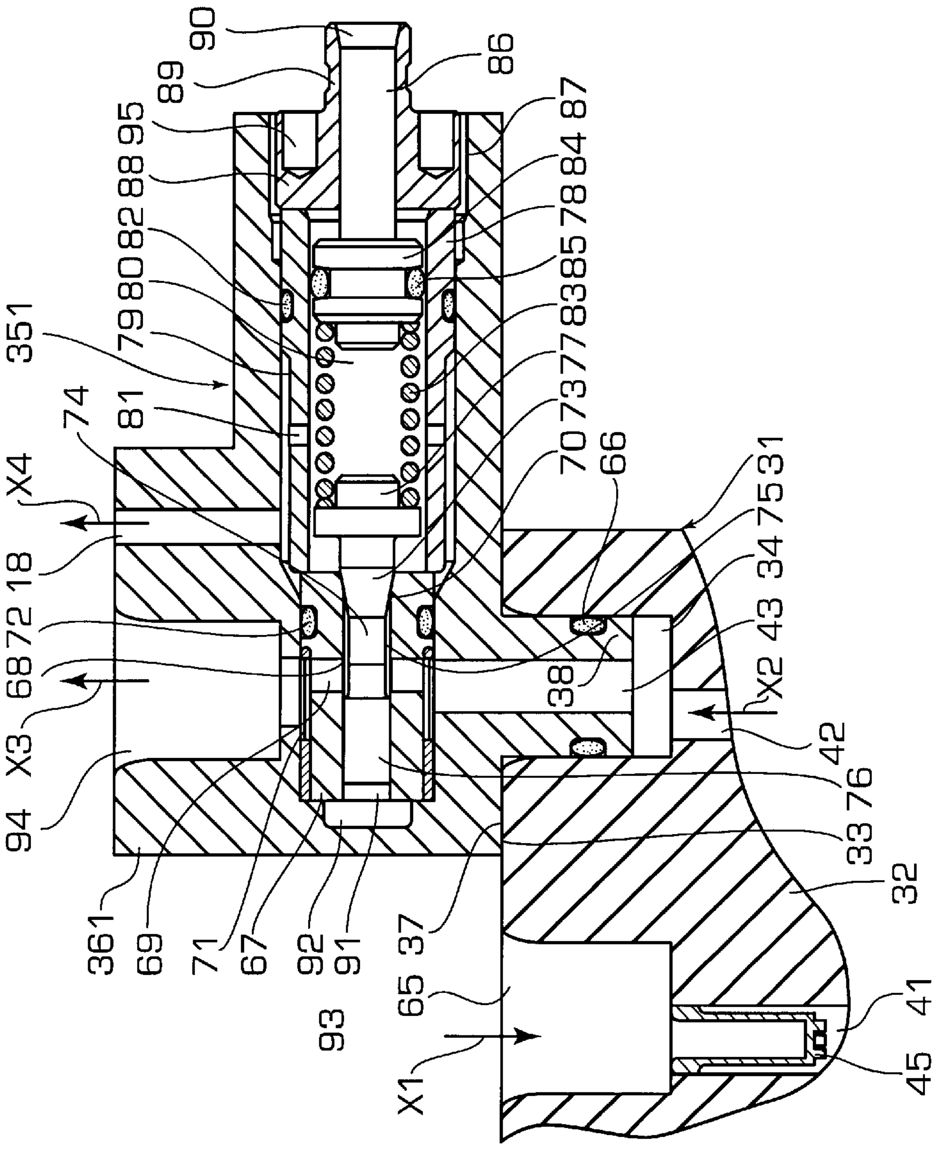
FIG. 3 is a sectional view of a high-pressure fuel pump device according to Embodiment 1.

FIG. 1 is a schematic diagram showing a fuel supply system according to Embodiment 1 of the present invention, FIG. 2 is a schematic diagram showing details of the fuel supply system and FIG. 3 is a sectional view showing the assembly structure of a high-pressure pump 31 and a high-pressure regulator 35 of a high-pressure fuel pump device 30 in the fuel supply system. In FIG. 1, the pump body 32 of the high-pressure pump 31 has a high-pressure valve connection portion 34 on the exterior side 33 including a high-pressure passage 42 on a pump side which is used to connect the high-pressure regulator 35. The valve housing 36 of the high-pressure regulator 35 has a high-pressure pump connection portion 38 on the exterior side 37 including a high-pressure passage 43 on a valve side which is used to connect the high-pressure pump 31. Those high-pressure connection portions are connected to each other to assemble the high-pressure pump 31 and the high-pressure regulator 35 together, thereby making it possible to standardize the pump body 32 and or the valve housing 36. That is, in the high-pressure pump 31, such elements as a pumping element 9, an intake valve 39 corresponding to the above intake valve 10, a discharge valve 40 corresponding to the above discharge valve 11, a low-pressure passage 41 on a pump side corresponding to the low-pressure passage 14 on the second housing side and a high-pressure passage 42 on a pump side corresponding to the high-pressure passage 16 on the second housing side are incorporated in the pump body 32 without using the valve housing 36. In the high-pressure regulator 35, such elements as a valve and a valve seat which will be described later, a drain return passage 18, a high-pressure passage 43 on a valve side corresponding to the first high-pressure passage 16 on the second housing side and a high-pressure passage 44 on a valve inlet side corresponding to the second high-pressure passage 17 on the second housing side are incorporated in the valve housing 36 without using the pump body 32.

Figure 14:
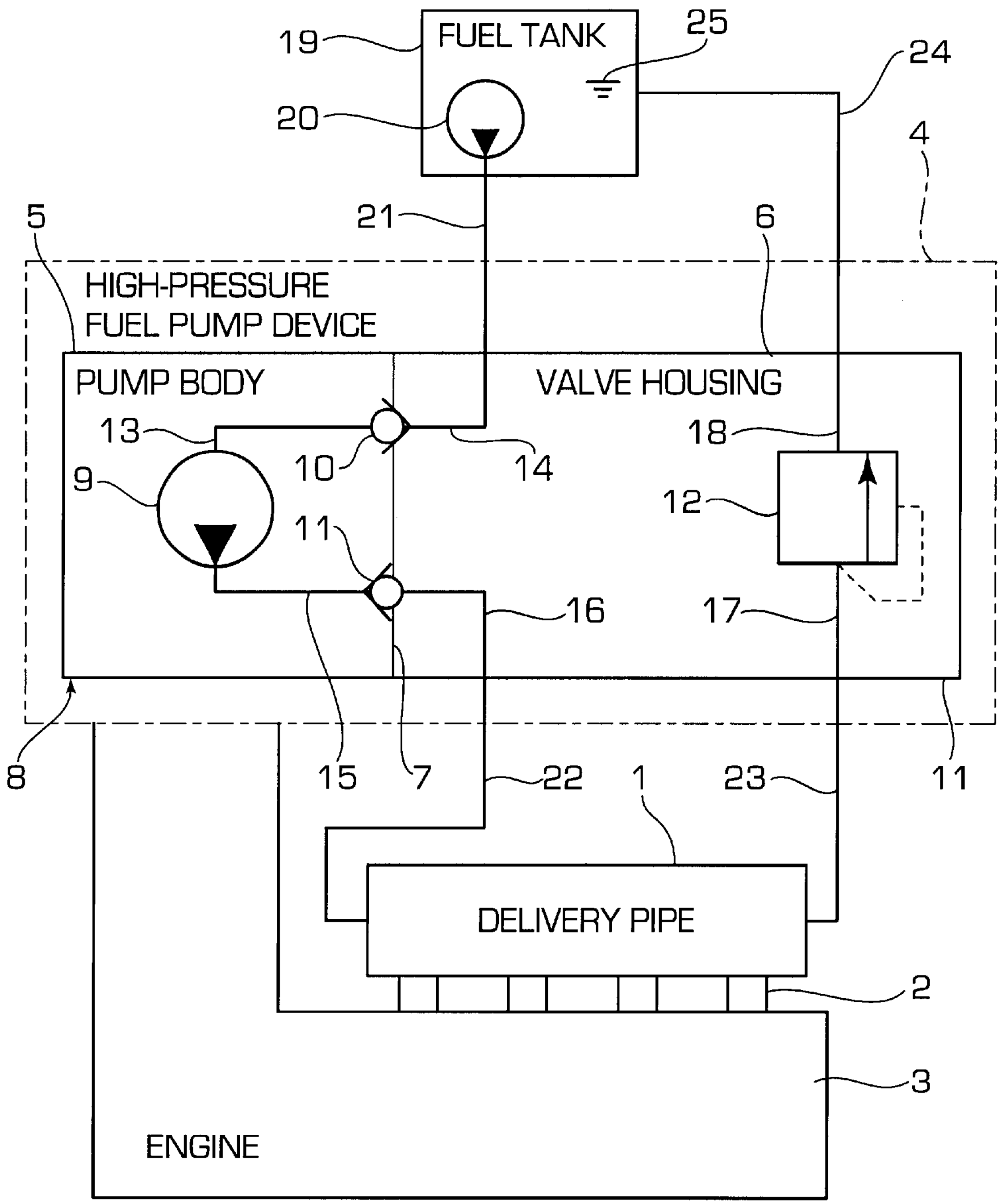
FIG. 14 PRIOR ART
FIG. 14 is a schematic diagram showing a fuel supply system of the prior art.

In this embodiment, the intake valve 39 is arranged in the low-pressure passage 41 on the pump side and the discharge valve 40 is arranged in the high-pressure passage 42 on the pump side. Although the intake valve 39 and the discharge valve 40 are illustrated as separate units, in the actual product, the intake valve 39 and the discharge valve 40 can be formed on a single reed valve plate. The high-pressure connection portion 34 is a circular hole which is depressed inward from the exterior side 33 of the pump body 32 and its diameter is set to a value larger than the diameter of the high-pressure passage 42 on the pump side. The high-pressure passage 42 on the pump side is open to the bottom of the high-pressure valve connection portion 34. The high-pressure pump connection portion 38 is shaped like a cylinder projecting outward from the exterior side 37 and its outer diameter is set to a value slightly smaller than the diameter of the high-pressure valve connection portion 34. The high-pressure passage 43 on the valve side is open to the bottom of the high-pressure pump connection portion 38. The high-pressure passage 43 on the valve side is also open to an exterior side not used to connect the pump body 32 of the valve housing 36. By mating the high-pressure valve connection portion 34 with the high-pressure pump connection portion 38, the high-pressure passage 42 on the pump side and the high-pressure passage 43 on the valve side are connected to each other to form a single high-pressure passage. The high-pressure passage 44 on the valve inlet side branches off from the high-pressure passage 43 on the valve side. Such elements as the delivery pipe 1, injectors 2, engine 3, drain return passage 18, fuel tank 19, low-pressure pump 20, low-pressure pipe 21, high-pressure pipe 22, drain return pipe 24 and fuel 25 are identical to those of the prior art shown in FIG. 14.

In FIG. 2, the pump body 32 has therein a pumping element 9, a filter 45 provided in the low-pressure passage 41 on the pump side to remove foreign matter from the fuel 25, a low-pressure damper 46 provided in the low-pressure passage 41 on the pump side at a downstream side of the filter 45 to absorb the pulsation of low-pressure fuel, a check valve 47 provided in the high-pressure passage 42 on the pump side, a buffer chamber 48 provided in the high-pressure passage 42 on the pump side at a downstream side of the check valve 47, a resonator 51 which is a Helmholtz resonator comprising an orifice 49 connected to the buffer chamber 48 and a control chamber 50, and a pump drain passage 54 for the pump pressure increasing unit 9.

The resonator 51 reduces the amplitude of fuel pressure pulsation at the resonance frequency in the high-pressure passage 42 that is caused by the discharge pulsation of the pumping element 9 with resonance characteristics which are determined by the shape of the orifice 49 and the volume of the control chamber 50.

A fuel pressure sensor 55 connected to the delivery pipe 1 monitors the pressure of fuel so that the proper amount of fuel is injected into the combustion chamber of the engine 3 at a valve opening time of the injector 2 even when the pressure of fuel is unstable at the start of the engine or even when the pressure of fuel is unstable due to the malfunction of the high-pressure regulator 35. The output signal of the fuel pressure sensor 55 is supplied to an unshown engine control unit (ECU). The engine control unit carries out control for the injection of proper amount of fuel into the combustion chamber of the engine 3 based on the signal from the fuel pressure sensor 55. This control will not be detailed here in because it is not the subject matter of Embodiment 1.

Reference numeral 56 in FIG. 2 is a filter on the inlet side of the low-pressure pump 20, 57 a low-pressure check valve arranged in the low-pressure pipe 21, 58 a filter arranged in the low-pressure pipe 21 closer to the high-pressure fuel pump device 30 than the low-pressure check valve 57, 59 a low-pressure return pipe connected to a low-pressure regulator 60 arranged in the low-pressure pipe 21 between the filter 58 and the high-pressure fuel pump device 30 and to the fuel tank 19, and 61 a drain pipe connected to the pump drain passage 54 and to the fuel tank 19. Fuel leaking from a space between the piston and the cylinder of the pumping element 9 is returned to the fuel tank 19 from the pump drain passage 54 through the drain pipe 61.

In FIG. 3, denoted by 65 is a low-pressure pipe connection portion of the high-pressure pump 31 formed in the pump body 32, which is formed as a circular hole depressed toward the inside of the pump body 32 from the same exterior side as the exterior side 33 and its diameter is set to a value larger than the diameter of the low-pressure passage 41 on the pump side which is open to the bottom of the low-pressure pipe connection portion 65. The low-pressure pipe 21 shown in FIG. 2 is connected to the low-pressure pipe connection portion 65. The filter 45 is press fitted in the low-pressure passage 41 on the pump side through the low-pressure pipe connection portion 65. Reference numeral 66 is a sealing member such as an O ring for preventing fuel from leaking from a gap between the high-pressure valve connection portion 34 on the pump side and the high-pressure pump connection portion 38 on the valve side. The above high-pressure regulator 35 may be of either a mechanical or electromagnetic type. In FIG. 3, a mechanical high-pressure regulator 351 is illustrated.

The structure of the high-pressure regulator 351 will be described herein under. Denoted by 67 is a cylindrical valve seat stored in a valve housing 361 corresponding to the above valve housing 36 in such a matter that it crosses the high-pressure passage 43 on the valve side, 68 a valve guide hole extending through the center of the valve seat 67 in an axial direction, 69 a high-pressure passage on the valve seat side extending through the wall of the valve seat 68 in such a manner that it is connected to the high-pressure passage 43 and crosses the valve guide hole 68, and 70 an annular valve seat surface formed at an inner periphery where one end surface of the valve seat 67 intersects the valve guide hole 68. Reference numeral 71 denotes a cylindrical filter inserted between the valve seat 67 and the valve housing 361 to remove foreign matter from fuel 25 (see FIG. 2) between the high-pressure passage 43 on the valve side and the high-pressure passage 69 on the valve seat side, and 72 a sealing member such as an O ring for preventing fuel from leaking from a gap between the valve seat 67 and the valve housing 361.

Denoted by 73 is a valve, 74 a small-diameter portion projecting from the end portion of the valve 73 and arranged in the valve guide hole 68, 75 an annular space formed by the small diameter portion 74 and the valve guide hole 68 to be communicated with the high-pressure passage 69 on the valve seat side, 76 a spool portion projecting from the end of the small-diameter portion 74 and inserted into the valve guide hole 68 in such a manner that it can move in an axial direction, 77 a spring support portion projecting from the end of the valve 73 and located outside the valve guide hole 68, 78 a cylindrical valve seat holder surrounding the spring support portion 77 in such a manner that it can move, which is installed in the valve housing 361 in such a manner that it presses the valve seat 67, 79 an outer space formed by the valve seat holder 78 and the valve housing 361, 80 an inner space formed in the inside of the valve seat holder 78, 81 a communication hole formed in the wall of the valve seat holder 78 to communicate the inner space 80 with the outer space 79, and 82 a sealing member such as an O ring for preventing fuel from leaking from a space between the valve seat holder 78 and the valve housing 361.

Denoted by 83 is a spring such as a coil spring which is inserted into the inner space 80 and whose one end is fixed to the spring support portion 77, 84 a spring holder inserted into the inner space 80 to press the other end of the spring 83, 85 a sealing member such as an O ring preventing fuel from leaking from a space between the spring holder 84 and the valve seat holder 78, 86 a column projecting from the center of the side opposite to the spring 83 of the spring holder 84, 87 a thread formed in the valve housing 361 which is open to out side of the valve housing 361, 88 a cylindrical cap mated with the thread 87, and 89 a cylindrical fixing portion projecting from the cap 88.

The valve seat 67 fitted with the filter 71 and the sealing member 72 is inserted into the valve housing 361, the valve 73 is inserted into the valve seat 67, the valve seat holder 78 fitted with the sealing member 82 is inserted into the valve housing 361, the springs 83 are inserted into the inside of the valve seat holder 78, the spring holder 84 fitted with the sealing member 85 is inserted into the inside of the valve seat holder 78, and the cap 88 is fastened to the thread 87 with the column 86 contained in the inside hole 90 of the cap 88 firmly fixes the valve seat 67 and the valve seat holder 78 in the valve housing 361. Thereafter, by pressing the column 86 from the out side with an unshown tool, the force of the spring 83 to be applied to the valve 73 is controlled such that it is balanced with a predetermined pressure to be set by the high-pressure regulator 351. In this state, a portion projecting outward from the valve housing 361 of the fixing portion 89 is deformed inward , whereby the column 86 and the fixing portion 89 are connected to each other.

Denoted by 91 is an end space which remains in front of the spool portion 76 in the valve guide hole 68 when the valve 73 is in contact with the valve seat surface 70, and 92 a recessed portion formed at the bottom of the space for storing the valve seat 67 of the valve housing 361. The diameter of the recessed portion 92 is set to a value smaller than the outer diameter of the valve seat 67. The end space 91 and the recessed portion 92 form a single damper chamber 93. The damper chamber 93 is filled with part of fuel 25 (see FIG. 2) from the high-pressure passage 69 on the valve seat side through a space between the valve guide hole 68 and the spool portion 76. The characteristics of the spool portion 76 can be controlled by setting the volume of the damper chamber 93 and a clearance between the valve guide hole 68 and the spool portion 76 to appropriate values, thereby making it possible to suppress the unstable oscillation of the valve 73. Since the volume of the damper chamber 93 is determined by such conditions as the mass of the valve 73, the size of the clearance between the valve guide hole 68 and the spool portion 76, and the spring force of the spring 83, there is a case where the end space 91 does not exist.

Reference numeral 94 denotes a high-pressure pipe connection portion formed in the valve housing 361, which is formed as a circular hole depressed toward the inside of the valve housing 361 from an exterior side opposite to the exterior side 37 and whose diameter is set to a value larger than the diameter of the high-pressure passage 43 on the valve side which is open to the bottom portion of the high-pressure pipe connection portion 94. The high-pressure pipe 22 shown in FIG. 2 is connected to the high-pressure pipe connection portion 94. Reference numeral 95 is a tool hole formed in the cap 88, which a fastening tool is fitted in to fasten the cap 88. The drain return passage 18 is illustrated as being formed in the valve housing 361 in parallel to the high-pressure pipe connection portion 94. In the actual product, if the drain return passage 18 is formed in the valve housing 361 such that it is directed perpendicularly to FIG. 3 the high-pressure pipe 22 and the drain return pipe 24 are separated from each other, thereby making it easy to install the high-pressure pipe 22 and the drain return pipe 24 in the valve housing 361.

X1 signifies a flow direction of fuel from the low-pressure pipe 21 of FIG. 2 to the low-pressure passage 41 on the pump side, X2 a flow direction of fuel from the high-pressure passage 42 on the pump side to the high-pressure passage 43 on the valve side, X3 a flow direction of fuel from the high-pressure passage 43 on the valve side to the high-pressure pipe connection portion 94 through the filter 71, high-pressure passage 69 on the valve seat side and annular space 75, and X4 a flow direction of fuel from the annular space 75 to the drain return passage 18 through the space between the valve seat surface 70 and the valve 73, inner space 80, communication hole 81 and outer space 79 when the pressure of fuel in the high-pressure passage 69 on the valve seat side exceeds the predetermined value set by the high-pressure regulator 351.

According to the structure of this embodiment, the high-pressure pump 31 incorporates in the pump body 32 such elements as the pumping element 9, intake valve 39, discharge valve 40, low-pressure passage 41 on the pump side, high-pressure passage 42 on the pump side, filer 45, low-pressure damper 46, check valve 47, buffer chamber 48, resonator 51, pump drain passage 54 and low-pressure pipe connection portion 65 and has the high-pressure connection portion 34 on the exterior side 33 of the pump body 32 for connecting the high-pressure regulator 351. The high-pressure regulator 351 incorporates in the valve housing 361 such elements as the drain return passage 18, high-pressure passage 43 on the valve side, high-pressure passage 44 on the valve inlet side, valve seat 67, filter 71, sealing member 72, valve 73, annular space 75, valve seat holder 78, outer space 79, inner space 80, communication hole 81, sealing member 82, springs 83, spring holder 84, sealing member 85, cap 88, damper chamber 93 and high-pressure pipe connection portion 94 and has the high-pressure pump connection portion 38 on the exterior side 37 for connecting the high-pressure pump 31 of the valve housing 361. The sealing member 66 is fitted in the high-pressure pump connection portion 38, and the pump body 32 and the valve housing 361 are fastened together by unshown bolts while the high-pressure valve connection portion 34 and the high-pressure pump connection portion 38 are mated with each other. The bolts are fastened at a position where they do not interfere with the elements of the high-pressure pump 31 and the elements of the high-pressure regulator 351. Thereby, a space between the high-pressure valve connection portion 34 and the high-pressure pump connection portion 38 is sealed up by the sealing member 66, the exterior side 33 and the exterior side 37 are placed one upon the other, and the high-pressure pump 31 and the high-pressure regulator 351 are assembled together.

Embodiment 2

Figure 4:
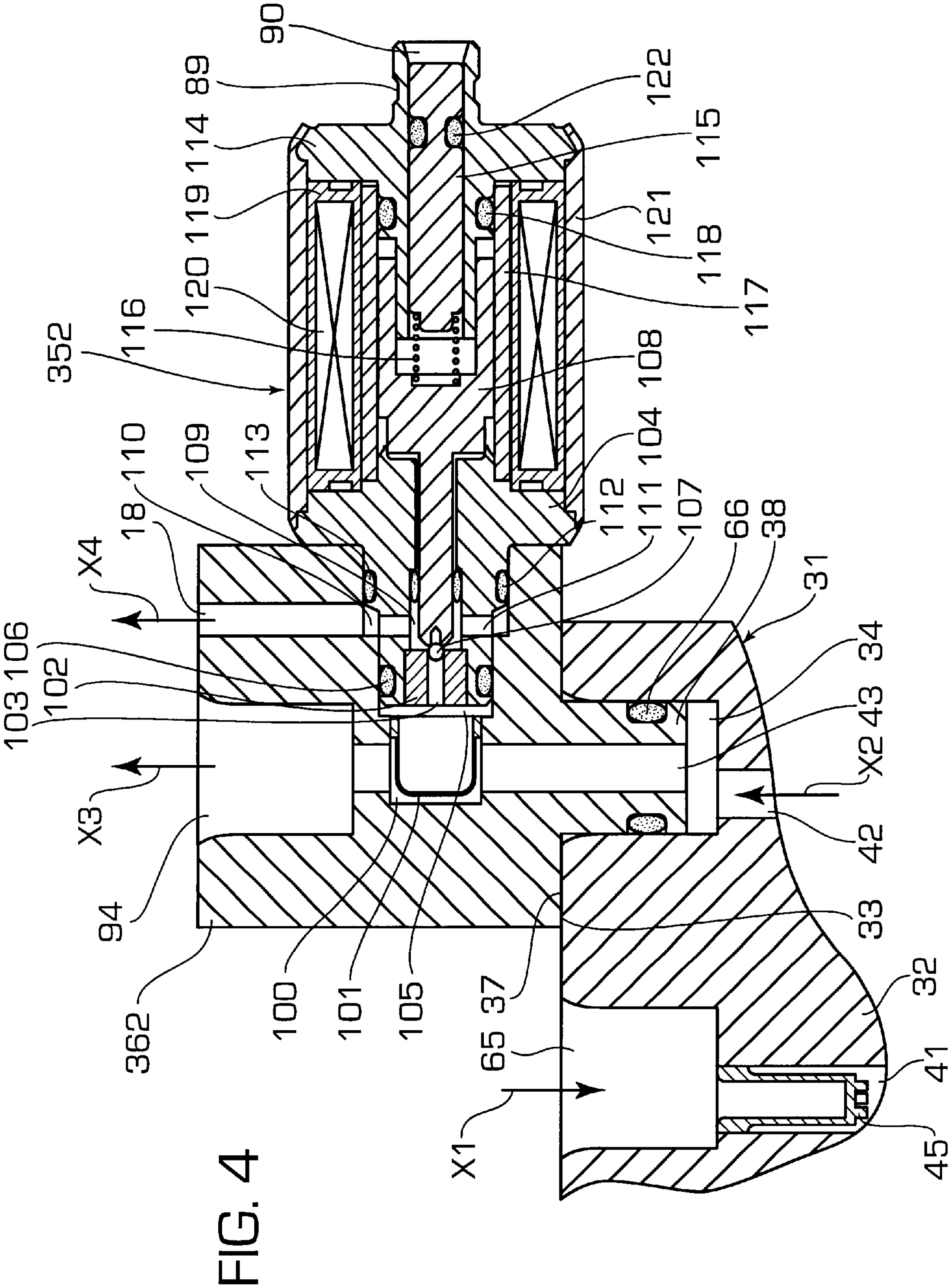
FIG. 4 is a sectional view of a high-pressure fuel pump device according to Embodiment 2 of the present invention.

In the above Embodiment 1, the high-pressure regulator 351 is of a mechanical type. As shown in FIG. 4, the high-pressure pump 31 is of the same type as in the above Embodiment 1, and an electromagnetic high-pressure regulator 352 is used in conjunction with this high-pressure pump 31. FIG. 4 is a sectional view showing the assembly structure of the high-pressure pump 31 and the high-pressure regulator 352 of a high-pressure fuel pump device 30 according to Embodiment 2 of the present invention. In FIG. 4, the high-pressure pump 31 has a high-pressure connection portion 34 which is a circular hole connected to the high-pressure passage 42 on the pump side and a low-pressure pipe connection portion 65 on the exterior side 33 of the pump body 32 for connecting the high-pressure regulator 352. The high-pressure regulator 352 has a cylindrical high-pressure connection portion 38 on the extension side 37 which connects the high-pressure pump 31 and includes the high-pressure passage 43 on the valve side in the valve housing 362 corresponding to the above valve housing 361. A sealing member 66 is fitted in the high-pressure pump connection portion 38, and the pump body 32 and the valve housing 362 are fastened together by unshown bolts while the high-pressure valve connection portion 34 and the high-pressure pump connection portion 38 are mated with each other, whereby the exterior side 33 and the exterior side 37 are placed one upon the other, and the high-pressure pump 31 and the high-pressure regulator 352 are assembled together. The bolts are fastened at a position where they do not interfere with the elements of the high-pressure pump 31 and the elements of the high-pressure regulator 352 like Embodiment 1.

The electromagnetic high-pressure regulator 352 will be described hereinafter. Reference numeral 100 denotes a filter storage chamber formed in the valve housing 362 in such a manner that it extends into the high-pressure passage 43 on the valve side from a horizontal direction, 101 a filter corresponding to the above filter 71, 102 a valve seat corresponding to the above valve seat 67, 103 a through hole formed in the center of the valve seat 102, 104 a core whose end portion for holding the valve seat 102 is incorporated in the valve housing 362, 105 an inner space surrounded by the filter storage chamber 100, the filter 101, the core 104, the valve seat 102 and the valve housing 362 and connected to the filter storage chamber 100 and the through hole 103, 106 a sealing member such as an O ring for preventing fuel from leaking from a space between the valve housing 362 and the core 104, 107 a spherical valve corresponding to the above valve 73, 108 a plunger whose end portion is inserted into the center of the core 104 in such a manner that it can move, 109 an annular inner space corresponding to the above inner space 80 and surrounded by the core 104, the valve 107 and the plunger 108, 110 an annular outer space corresponding to the above outer space 79 and surrounded by the valve housing 362 and the core 104, and 111 a communication hole corresponding to the above communication hole 81 and formed in the wall of the core 104.

Denoted by 106 is a sealing member such as an O ring for preventing fuel from leaking from a space between the core 104 and the valve housing 362, 113 a bush inserted between the core 104 and the plunger 108 and movably supporting the plunger 108 with respect to the core 104, 114 a cap made of a magnetic material, 115 a spring holder inserted into the inside hole 90 of the cap 114 and connected to the fixing portion 89, 116 a spring such as a coil spring inserted between the spring holder 115 and the plunger 108 for urging the plunger 108 toward the valve 107 side so that the valve 107 contacts the valve seat surface of the valve seat 102, 117 a nonmagnetic cylindrical guide coaxially mated with the core 104 and the cap 114 and movably supporting in its center hole a rear half portion of the plunger 108 projecting from the core 104, and 118 a sealing member such as an O ring for preventing fuel from leaking from a space between the guide 117 and the cap 114.

Reference numeral 119 represents a bobbin fitted onto the guide 117, 120 a coil wound round the bobbin 119, and 121 a magnetic cylindrical yoke surrounding the bobbin 119 and the coil 120, whose both end portions are caulked to the peripheral portion of the core 104 and the peripheral portion of the cap 114 while the core 104 and the cap 114 support the bobbin 119 from both sides in an axial direction to prevent it from rattling. When electrical power is supplied to the coil 120, a magnetic circuit is formed by the yoke 121, the cap 114, the plunger 108 and the core 104, and the plunger 108 is urged toward the core 104 side magnetically. Since this magnetic urging force is the same in direction as the spring force of the spring 116 which is applied to the plunger 108 and changes according to a current supplied to the coil 120, the unshown engine control unit can control the fuel pressure set by the high-pressure regulator 352 by changing the current to the coil 120 based on a signal from the fuel pressure sensor 55 shown in FIG. 2. When the pressure of fuel applied to the valve 107 exceeds the value of the pressure determined by the total of the spring fore of the spring 116 and the magnetic force of the magnetic circuit while fuel 25 (see FIG. 2) is charged into the filter storage chamber 100, the filter 101, the inner space 105 and the through hole 103 from the high-pressure passage 43 on the valve side, the valve 107 moves in a direction to that it parts from the valve seat 102. Part of the fuel 25 is drained into the drain return passage 18 from a space between the valve seat 102 and the valve 107 through the inner space 109, the communication hole 111 and the outer space 110, thereby controlling the pressure of high-pressure fuel 25 in the high-pressure passage 42 on the pump side and the high-pressure passage 43 on the valve side. Reference numeral 122 signifies a sealing member such as an O ring for preventing fuel from leaking from a space between the cap 114 and the spring holder 115.

Embodiment 3

Figure 5:
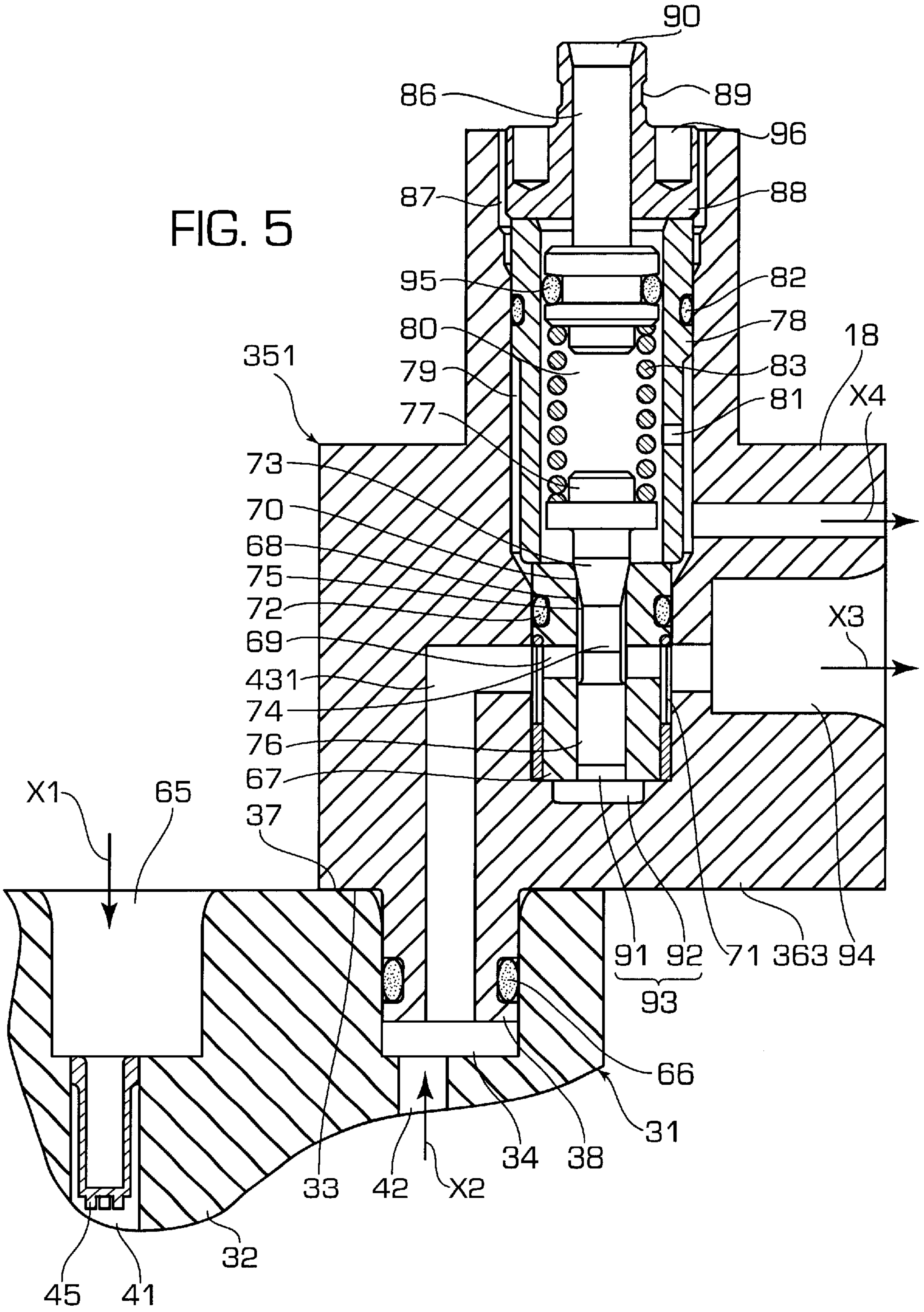
FIG. 5 is a sectional view of a high-pressure fuel pump device according to Embodiment 3 of the present invention.

In the above Embodiment 1, the horizontal type mechanical high-pressure regulator 351 is used for the high-pressure pump 31. As shown in FIG. 5, the high-pressure pump 31 is of the same type as in the above Embodiment 1, and a mechanical high-pressure regulator 351 is used vertically for this high-pressure pump 31. FIG. 5 is a sectional view showing the assembly structure of the high-pressure pump 31 and the high-pressure regulator 351 of a high-pressure fuel pump device 30 according to Embodiment 3 of the present invention. In FIG. 5, reference numeral 363 denotes a valve housing corresponding to the above valve housing 361, 431 a high-pressure passage on the valve side corresponding to the high-pressure passage 43 on the valve side whose intermediate portion bends toward a horizontal direction from a vertical direction and whose horizontal portion contains the valve seat 67, filter 71 and valve 73. While the high-pressure pump connection portion 38 fitted with the sealing member 66 is mated with the high-pressure valve connection portion 34, the pump body 32 and the valve housing 363 are fastened together by unshown bolts. The bolts are fastened at a position where they do not interfere with the elements of the high-pressure pump 31 and the elements of the high-pressure regulator 351. Thereby, a space between the high-pressure valve connection portion 34 and the high-pressure pump connection portion 38 is sealed up by the sealing member 66, the exterior side 33 and the exterior side 37 are placed on upon the other, and the high-pressure pump 31 and the high-pressure regulator 351 are assembled together.

Embodiment 4

Figure 6:
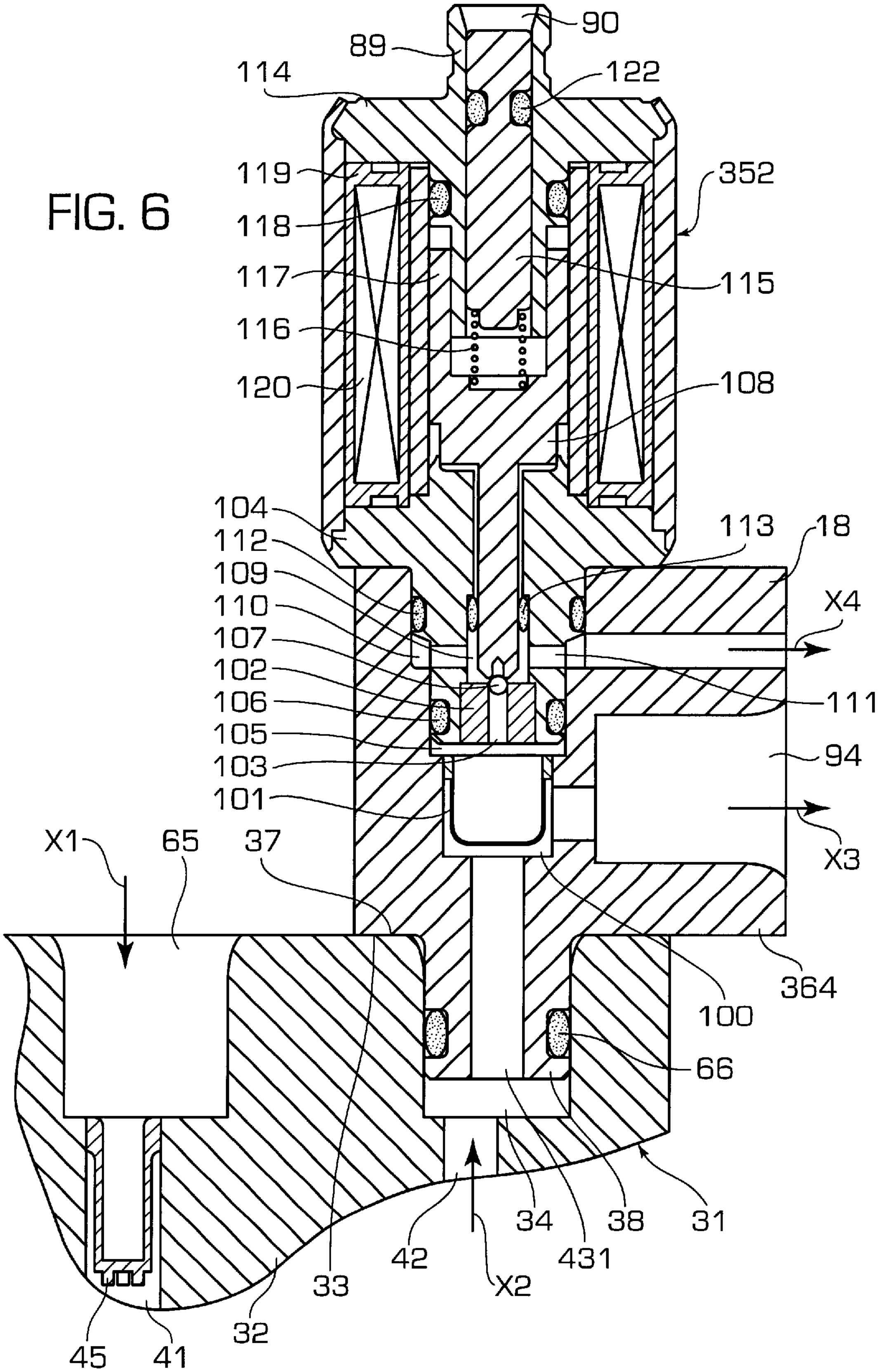
FIG. 6 is a sectional view of a high-pressure fuel pump device according to Embodiment 4 of the present invention.

In the above Embodiment 2, the horizontal type electromagnetic high-pressure regulator 352 is used for the high-pressure pump 31. As shown in FIG. 6, the high-pressure pump 31 is of the same type as in the above Embodiment 1, and an electromagnetic high-pressure regulator 352 is used vertically for the high-pressure pump 31. FIG. 6 is a sectional view showing the assembly structure of the high-pressure pump 31 and the high-pressure regulator 352 of a high-pressure fuel pump device 30 according to Embodiment 4 of the present invention. In FIG. 6, reference numeral 364 denotes a valve housing corresponding to the above valve housing 361, which has a high-pressure passage 431 on the valve side bending toward a horizontal direction from a vertical direction. The filter storage chamber 100 and the filter 101 are arranged in the corner portion of the high-pressure passage 431 on the valve side. While the high-pressure pump connection portion 38 fitted with the sealing member 66 is mated with the high-pressure valve connection portion 34, the pump body 32 and the valve housing 364 are fastened together by unshown bolts. The bolts are fastened at a position where they do not interfere with the elements of the high-pressure pump 31 and the elements of the high-pressure regulator 352. Thereby, a space between the high-pressure valve connection portion 34 and the high-pressure pump connection portion 38 is sealed up by the sealing member 66, the exterior side 33 and the exterior side 37 are placed one upon the other, and the high-pressure pump 31 and the high-pressure regulator 352 are assembled together.

Embodiment 5

Figure 7:
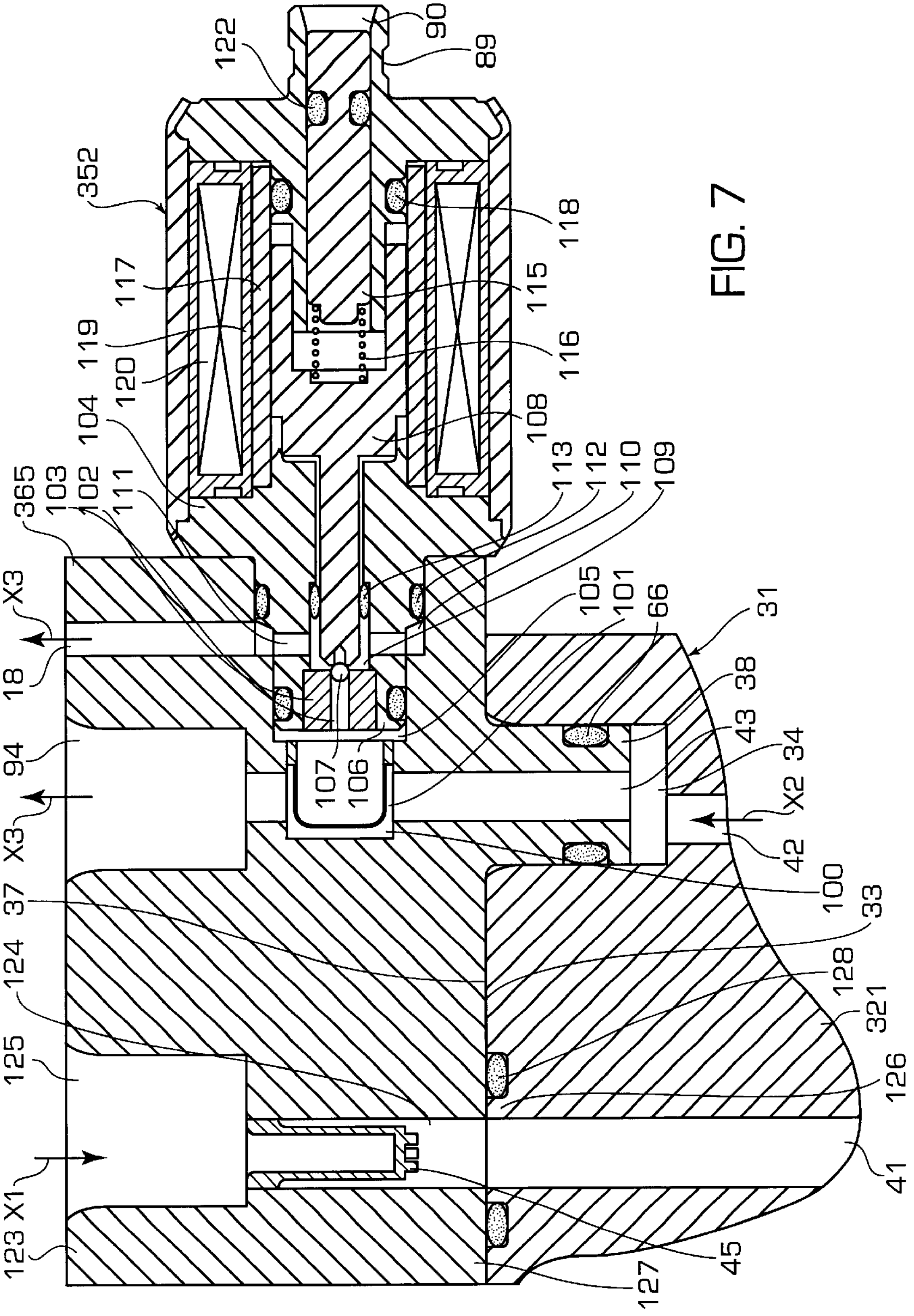
FIG. 7 is a sectional view of a high-pressure fuel pump device according to Embodiment 5 of the present invention.

In the above Embodiments 1 to 4, the high-pressure pump 31 of the single standard pump body 32 and the high-pressure regulator 351 or 352 of the valve housing 361, 362, 363 or 364 are assembled together. As shown in FIG. 7, the same type pump body 321 is used in place of the pump body 32 of the high-pressure pump 31 and an electromagnetic high-pressure regulator 352 is used horizontally for the high-pressure pump 31. FIG. 7 is a sectional view showing the assembly structure of the high-pressure pump 31 and the high-pressure regulator 352 of a high-pressure fuel pump device 30 according to Embodiment 5 of the present invention. In FIG. 7, the above low-pressure pipe connection portion 65 is removed from the pump body 321 and the above low-pressure passage 41 on the pump side is open to the exterior side 33.

A valve housing 365 is obtained by forming an extension portion 123 for covering the opening of the low-pressure passage 41 on the pump side on the top of above valve housing 362, and the extension portion 123 has a low-pressure passage 124 on the valve side and a low-pressure pipe connection portion 125 corresponding to the above low-pressure pipe connection portion 65.

In other words, a portion of the pump body 321 to which the low-pressure passage 41 on the pump side is open is the flat exterior side 33 and it forms a low-pressure valve connection portion 126. The low-pressure passage 124 on the valve side is open to the exterior side 37 and the low-pressure pipe connection portion 125 is open to the exterior side to which the high-pressure pipe connection portion 94 is also open. A portion of the extension portion 123 to which the low-pressure passage 124 on the valve side is open is the flat exterior side 37 and if forms a low-pressure pump connection portion 127. When the high-pressure valve connection portion 34 and the high-pressure pump connection portion 38 are mated with each other, the low-pressure passage 124 on the valve side and the low-pressure passage 41 on the pump side are also connected to each other to form a single low-pressure passage. The diameter of the low-pressure passage 124 on the valve side is set to a value smaller than the diameter of the low-pressure pipe connection portion 125, and the low-pressure passage 124 on the valve side is open to the bottom portion of the low-pressure pipe connection portion 125. The filter 45 is fitted in the low-pressure passage 124 on the valve side from the low-pressure pipe connection portion 124. Reference numeral 128 is a sealing member such as an O ring for preventing fuel from leaking from a space between the low-pressure valve connection portion 126 and the low-pressure pump connection portion 127.

While the high-pressure pump connection portion 38 fitted with the sealing member 66 and the high-pressure valve connection portion 34 are mated with each other and the low-pressure valve connection portion 126 fitted with the sealing member 128 and the low-pressure pump connection portion 127 are placed one upon the other, the pump body 32 and the valve housing 364 are fastened together by unshown bolts. The bolts are fastened at a position where they do not interfere with the elements of the high-pressure pump 31 and the elements of the high-pressure regulator 352. Thereby, a space between the high-pressure valve connection portion 34 and the high-pressure pump connection portion 38 is sealed up by the sealing member 66, a space between the low-pressure valve connection portion 126 and the low-pressure pump connection portion 127 is sealed up by the sealing member 128, the exterior side 33 and the exterior side 37 are placed one upon the other, and the high-pressure pump 31 and the high-pressure regulator 352 are assembled together.

Embodiment 6

Figure 8:
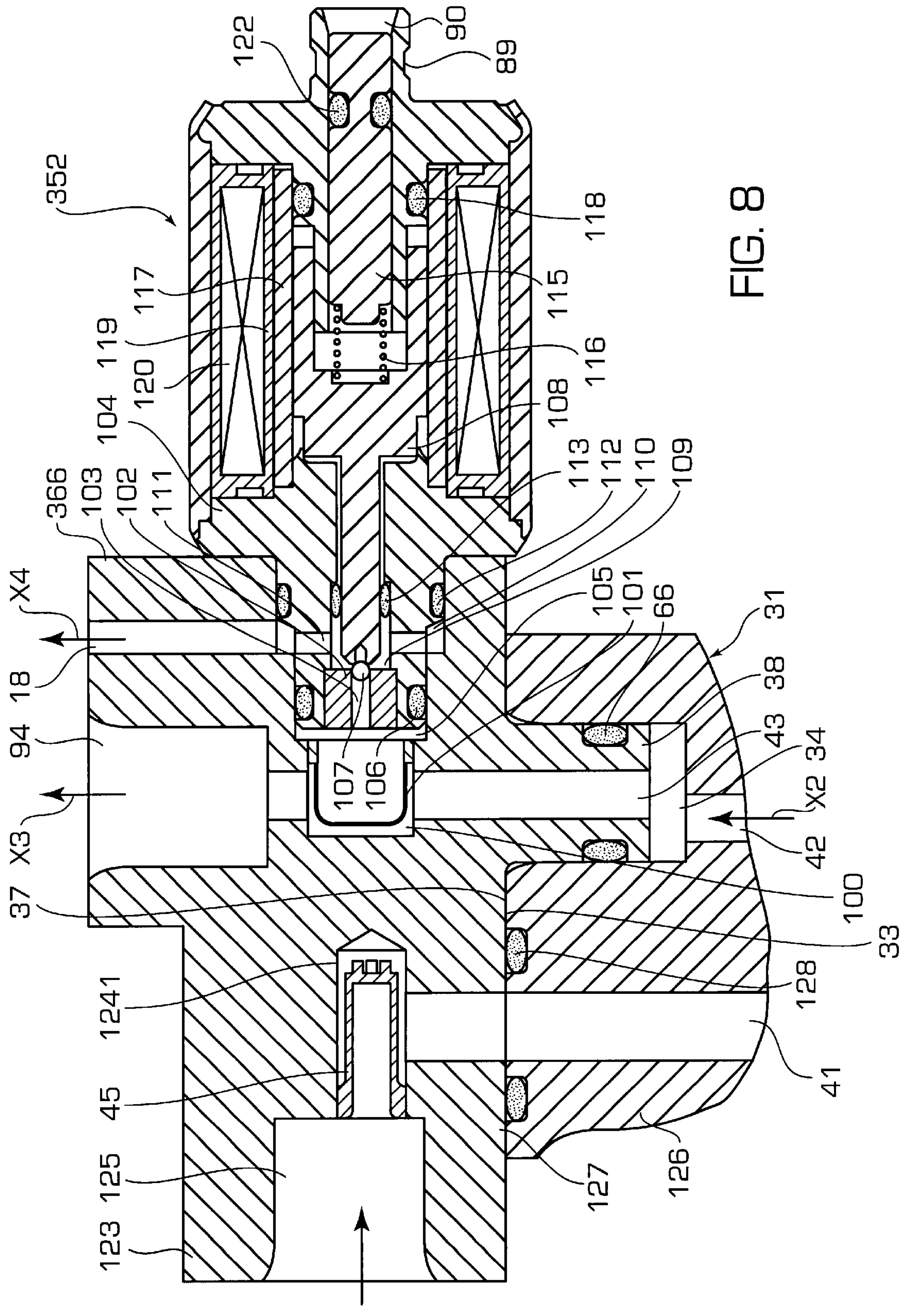
FIG. 8 is a sectional view of a high-pressure fuel pump device according to Embodiment 6 of the present invention.

In the above Embodiment 5, the low-pressure pipe connection portion 125 is provided on the same side as the high-pressure pipe connection portion 94. As shown in FIG. 8, the low-pressure pipe connection portion 125 is provided on an exterior side different from that of the high-pressure pipe connection portion 94. FIG. 8 is a sectional view showing the assembly structure of the high-pressure pump 31 and the high-pressure regulator 352 of a high-pressure fuel pump device 30 according to Embodiment 6 of the present invention. In FIG. 8, reference numeral 366 is a valve housing corresponding to the above valve housing 365, and 1241 a low-pressure passage on the valve side corresponding to the above low-pressure passage 124 on the valve side, whose intermediate portion bends toward a horizontal direction opposite to the valve 107 and the filter 45 is press fitted into the horizontal portion of the low-pressure passage 1241 from the low-pressure pipe connection portion 125.

Embodiment 7

Figure 9:
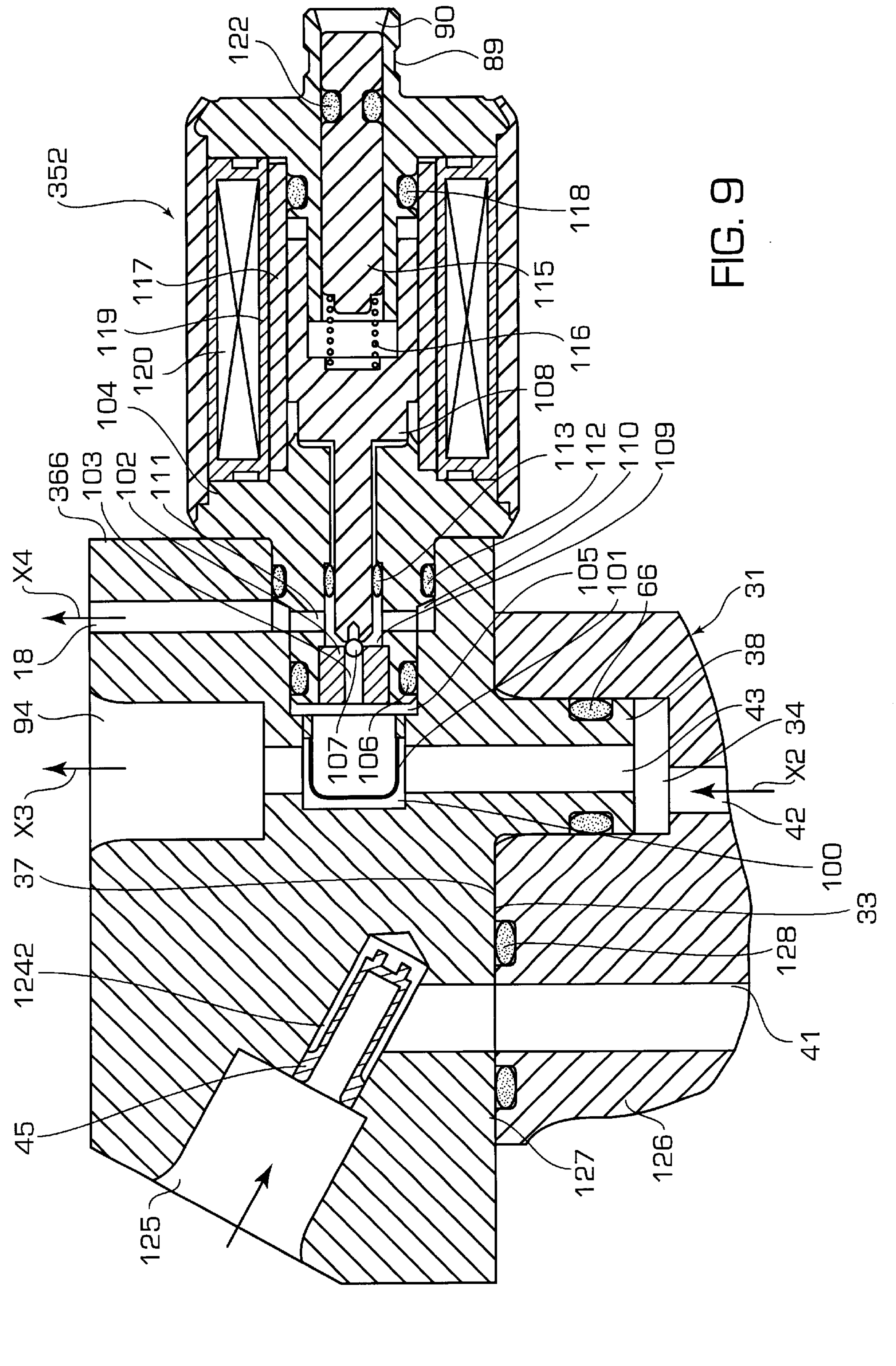
FIG. 9 is a sectional view of a high-pressure fuel pump device according to Embodiment 7 of the present invention.

In the above Embodiment 6, the low-pressure pipe connection portion 125 is provided on the exterior side opposite to the valve 107. As shown in FIG. 9, the low-pressure pipe connection portion 125 is provided on an inclined exterior side different from that of the high-pressure pipe connection portion 94. FIG. 9 is a sectional view showing the assembly structure of the high-pressure pump 31 and the high-pressure regulator 352 of a high-pressure fuel pump device 30 according to Embodiment 7 of the present invention. In FIG. 9, reference numeral 367 denotes a valve housing corresponding to the above valve housing 366, and 1242 a low-pressure passage on the valve side corresponding to the above low-pressure passage 1241 on the valve side, whose intermediate portion bends obliquely toward a side opposite to the valve 107 and the filter 45 is press fitted into the obliquely bent portion of low-pressure passage 1242 from the low-pressure pipe connection portion 125.

Embodiment 8

Figure 10:
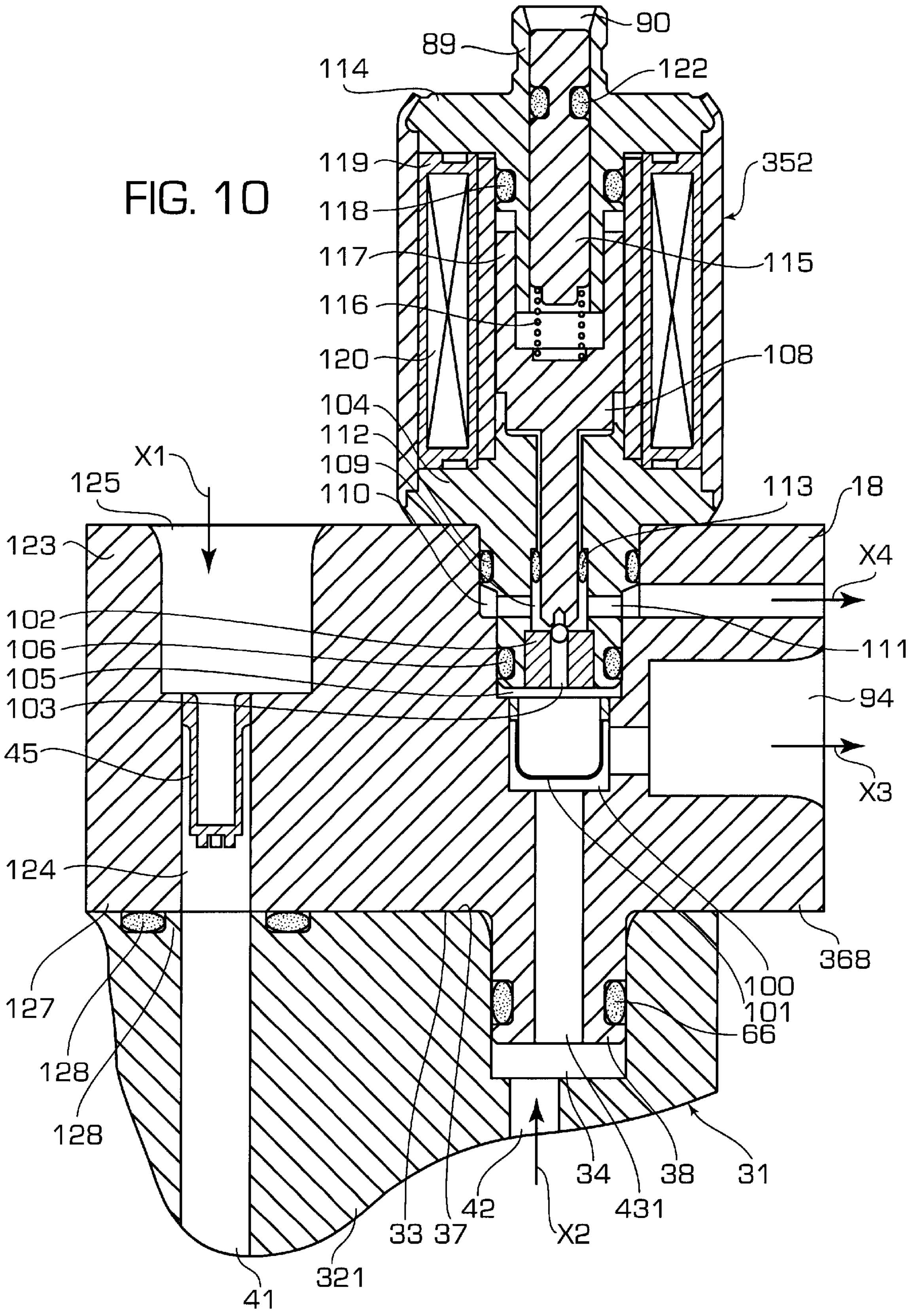
FIG. 10 is a sectional view of a high-pressure fuel pump device according to Embodiment 8 of the present invention.

In the above Embodiment 7, the low-pressure pump connection portion 127 is formed for the high-pressure pump 31 in the valve housing 367 in which the electromagnetic high-pressure regulator 352 is installed horizontally. As shown in FIG. 10, the low-pressure pump connection portion 127 is formed in a valve housing 368 in which the high-pressure regulator 352 is installed vertically. FIG. 10 is a sectional view showing the assembly structure of the high-pressure pump 31 and the high-pressure regulator 352 of a high-pressure fuel pump device 30 according to Embodiment 8 of the present invention. In FIG. 10, the valve housing 368 is obtained by forming the extension portion 123 for covering the opening of the low-pressure passage 41 on the pump side on the top of the above valve housing 364, and the extension portion 123 has the low-pressure passage 124 on the valve side and the low-pressure pipe connection portion 125.

Embodiment 9

Figure 11:
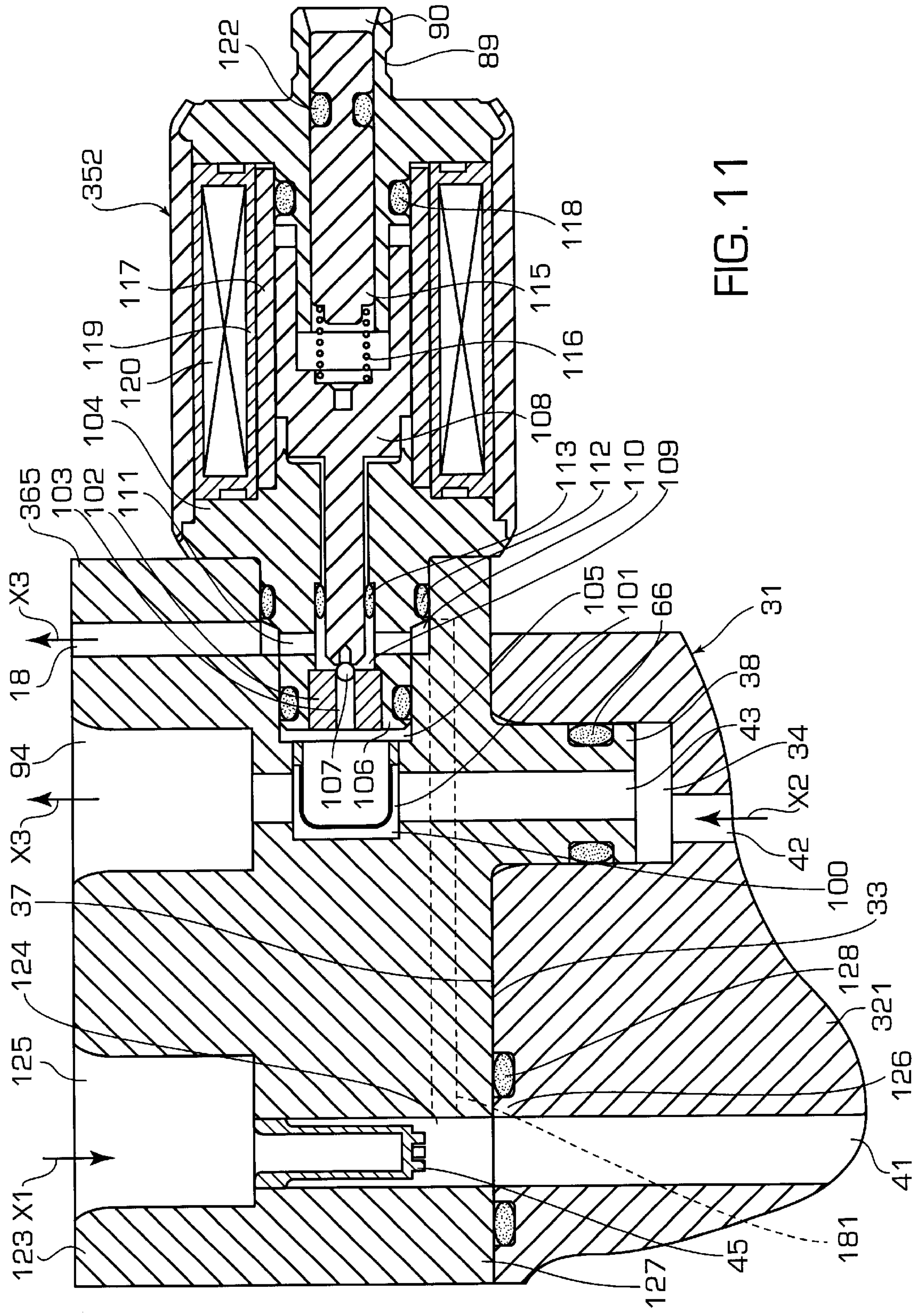
FIG. 11 is a sectional view of a high-pressure fuel pump device according to Embodiment 9 of the present invention.

In the above Embodiment 5, the low-pressure pump connection portion 127 is formed in the valve housing 365 in which the electromagnetic high-pressure regulator 352 is installed horizontally with respect to the high-pressure pump 31. As shown in FIG. 11, the low-pressure pump connection portion 127 and a drain return passage 181 corresponding to the above drain return passage 18 are formed in a valve housing 369 corresponding to the above valve housing 365, and the drain return passage 181 is connected to the outer space 110 and to the low-pressure passage 124 on the valve side at a downstream side of the filter 45, thereby making it possible to remove the drain return pipe 24 (see FIG. 2). FIG. 11 is a sectional view showing the assembly structure of the high-pressure pump 31 and the high-pressure regulator 352 of a high-pressure fuel pump device 30 according to Embodiment 9 of the present invention. In FIG. 11, the drain return passage 181 is formed in the inside of the valve housing 369 such that it is not open to the exterior side of the valve housing 369 and does not interfere with the high-pressure passage 43 on the valve side. Therefore, fuel 25 (see FIG. 2) drained from the high-pressure passage 43 on the valve side through a space between the valve seat 102 and the valve 107 is returned to the low-pressure passage 124 on the valve side at a downstream side of the filter 45 from the outer space 110 through the drain return passage 181.

Embodiment 10

Figure 12:
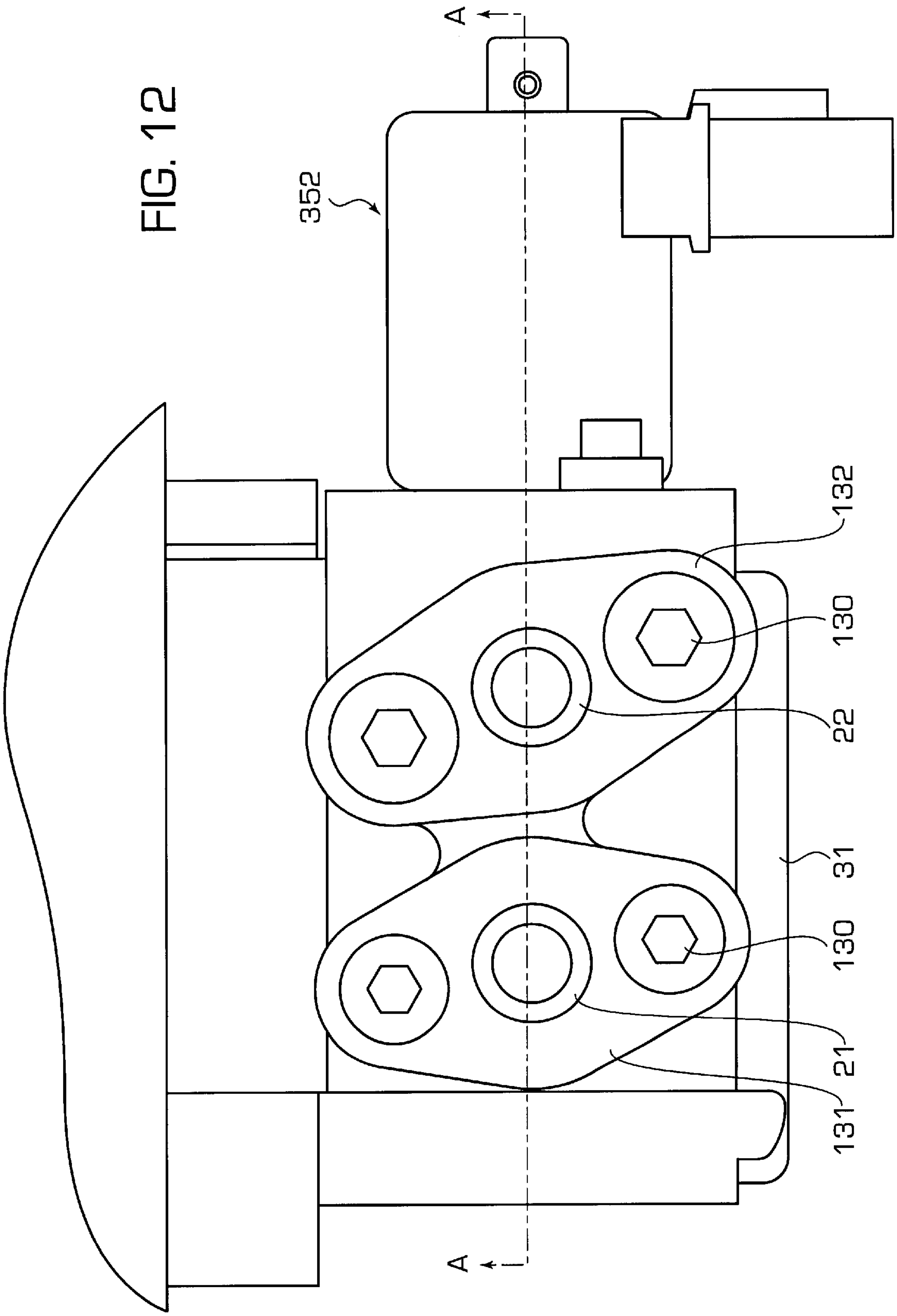
FIG. 12 is a top view of a high-pressure fuel pump device according to Embodiment 10 of the present invention.
Figure 13:
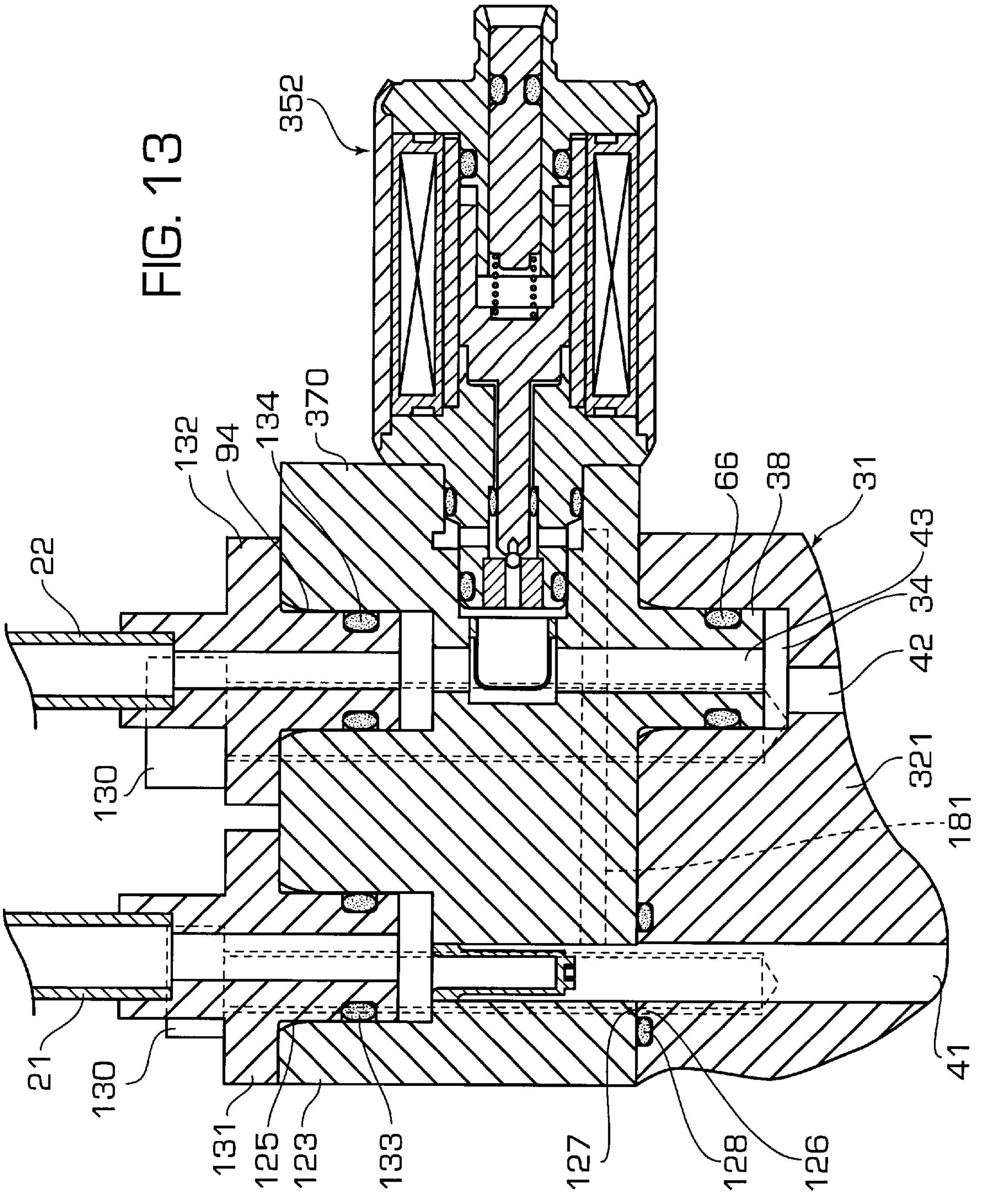
FIG. 13 is a sectional view cut on line A—A of FIG. 12.

In the above Embodiments 1 to 9, the pump body 32 or 321 and the valve housing 36, 361, 362, 363, 364, 365, 366, 367, 368 or 369 are fastened together by unshown bolts. As shown in FIGS. 12 and 13, the low-pressure pipe 21, the high-pressure pipe 22, a valve housing 370 corresponding to the above valve housing 36, 361, 362, 363, 364, 365, 366, 367, 368 or 369 and a pump body 321 corresponding to the above valve body 32 or 321 are fastened together by bolts 130, thereby making easy assembly work. FIG. 12 is a top view showing the assembly structure of the high-pressure pump 31, the high-pressure regulator 352, the low-pressure pipe 21 and the high-pressure pipe 22 of a high-pressure fuel pump device 30 according to Embodiment 10 of the present invention, and FIG. 13 is a sectional view cut on line A—A of FIG. 12. In FIG. 12 and FIG. 13, reference numeral 131 is an adapter attached to the end of the low-pressure pipe 21 by welding or the like, 132 an adapter attached to the end portion of the high-pressure pipe 22 by welding or the like, 133 a sealing member such as an O ring for preventing fuel from leaking from a space between the adapter 131 and the low-pressure pipe connection portion 125, and 134 a sealing member such as an O ring for preventing fuel from leaking from a space between the adapter 132 and the high-pressure pipe connection portion 94 on the valve side. While the high-pressure valve connection portion 34 and the high-pressure pump connection portion 38 fitted with the sealing member 66 are mated with each other, the low-pressure valve connection portion 126 fitted with the sealing member 128 and the low-pressure pump connection portion 127 are placed one upon the other, and the adapters 131 and 132 fitted with the sealing members 133 and 134 are inserted into the low-pressure pipe connection portion 125 and the high-pressure pipe connection portion 94, respectively, the bolts 130 are screwed into unshown screw holes formed in the pump body 321 from unshown bolt insertion holes formed in the adapters 131 and 132 through unshown bolt insertion holes formed in the valve housing 370, whereby the low-pressure pipe 21, the high-pressure pipe 22, the valve housing 370 and the pump body 321 are fastened together by the bolts 130 to be assembled together.

In the above Embodiments 5 to 10, the electromagnetic high-pressure regulator 352 is used. The mechanical high-pressure regulator 351 may be used in place of the high-pressure regulator 352.

In the above Embodiments 1 to 10, the high-pressure valve connection portion 34 is recessed and the high-pressure pump connection portion 38 is projecting. The high-pressure valve connection portion 34 may be recessed and the high-pressure pump connection portion 38 may be projecting.

In the above Embodiments 5 to 10, the low-pressure valve connection portion 126 and the low-pressure pump connection portion 127 are flat. The low-pressure valve connection portion 126 may be recessed and the low-pressure pump connection portion 127 may be projecting, or the low-pressure valve connection portion 126 may be projecting and the low-pressure pump connection portion 127 may be recessed.

According to the first aspect of the present invention, since the high-pressure pump and the high-pressure regulator are assembled together by connecting the high-pressure valve connection portion of the pump body to the high-pressure pump connection portion of the valve housing, at least one of the pump body and the valve housing can be standardized. For example, when the pump body which is more complex and larger in size than the valve housing is standardized, a mechanical high-pressure regulator or an electromagnetic high-pressure regulator can be combined with a high-pressure pump of a single design with ease. Therefore, high-pressure pumps and high-pressure regulators may be mass-produced, and a high-pressure regulator of a mechanical or electromagnetic type and a high-pressure pump may be assembled together per application requirement, thereby making it possible to cut production cost.

According to the second aspect of the present invention, since the high-pressure valve connection portion and the high-pressure pump connection portion are connected to each other by mating, the high-pressure valve connection portion and the high-pressure pump connection portion serve to determine the assembly positions of the high-pressure pump and the high-pressure regulator, thereby making it easier to assemble the high-pressure pump and the high-pressure regulator together. If the outer diameter of the high-pressure pump connection portion and the outer diameter of the adapter provided at the end portion of the high-pressure pipe happen to be the same, even when the high-pressure pump whose internal structure is more complex than that of the high-pressure regulator is standardized, the high-pressure regulator or the high-pressure pipe can be connected to the standardized high-pressure pump.

According to the third aspect of the present invention, since the low-pressure connection portions are interconnected and the high-pressure connection portions are interconnected to assemble the high-pressure pump and the high-pressure regulator together, the low-pressure connection portion and the high-pressure pipe connection portion are removed from the pump body which is connected to the housing of the engine. Therefore, the standardization of the pump body becomes easier.

According to the fourth aspect of the present invention, since the low-pressure valve connection portion and the low-pressure pump connection portion are connected to each other face-to-face, even when the high-pressure valve connection portion and the high-pressure pump connection portion are connected to each other by mating, a tolerable dimensional error is absorbed by connection between the low-pressure valve connection portion and the low-pressure pump connection portion, thereby making it easier to assemble the high-pressure pump and the high-pressure regulator together.

According to the fifth aspect of the present invention, since the valve housing has a drain return passage for returning fuel to the low-pressure passage of the high-pressure pump, the drain return pipe between the fuel tank and the high-pressure regulator can be eliminated.

According to the sixth aspect of the present invention, since the drain return passage is connected to the low-pressure passage on a downstream side of the filter, if fuel flows back in the drain return passage, foreign matter contained in the fuel does not enter the regulator, thereby making it possible to prevent an operation failure caused by foreign matter on the valve seat surface.

According to the seventh aspect of the present invention, since the pump body and the valve housing are fastened together by bolts together with pipes connected to the valve housing, the bolt attachment holes for assembling the pump body and the valve housing together can serve as pipe connection holes, thereby making it possible to realize the pump body and the valve housing with a small number of holes.

What is claimed is:

1. A high-pressure fuel pump device comprising a high-pressure pump for increasing the pressure of fuel to a high level and a high-pressure regulator for controlling the pressure of fuel by draining part of the fuel discharged from the high-pressure pump, wherein the pump body of the high-pressure pump has a high-pressure valve connection portion on the exterior side including a high-pressure passage which is used to connect the high-pressure regulator, the valve housing of the high-pressure regulator has a high-pressure pump connection portion on the exterior side including a high-pressure passage which is used to connect the high-pressure pump, and the high-pressure valve connection portion and the high-pressure pump connection portion are connected to each other to assemble the high-pressure pump and the high-pressure regulator;

wherein the valve housing has a drain return passage for returning fuel to the low-pressure passage of the high-pressure pump; and wherein the drain return passage is connected to the low-pressure passage on a downstream side of a filter.

* * * * *